Sept. 13, 1927.

F. R. LOOMIS 1,642,589

TIRE LOCK

Filed March 11, 1927

Inventor
F. R. Loomis
By CA Snow & Co.
Attorneys.

Patented Sept. 13, 1927.

1,642,589

UNITED STATES PATENT OFFICE.

FRANK R. LOOMIS, OF MAPLETON, MINNESOTA.

TIRE LOCK.

Application filed March 11, 1927. Serial No. 174,548.

This invention has reference to pneumatic tires and aims to provide novel means for locking a tire to its rim to prevent the removal of the tire by unauthorized persons.

An important object of the invention is to provide means cooperating with the valve stem and dust cap of a tire valve for locking the dust cap to the valve stem to prevent the removal of the dust cap to remove the tire of which the dust cap forms a part.

A still further object of the invention is to provide a locking cap designed to completely house the protruding end of the valve stem and dust cap so that rotary movement of the guard cap to remove the same will result in the tightening of the dust cap on the valve stem.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
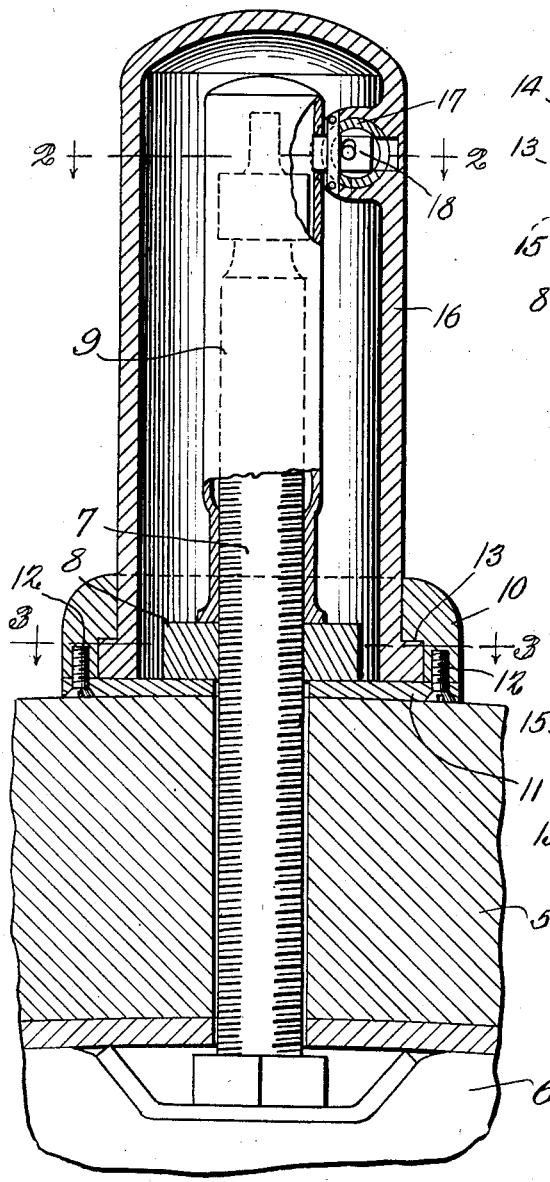
Figure 1 is a longitudinal sectional view through a portion of a rim and illustrating the guard cap in section as positioned over a valve.
Figure 2:
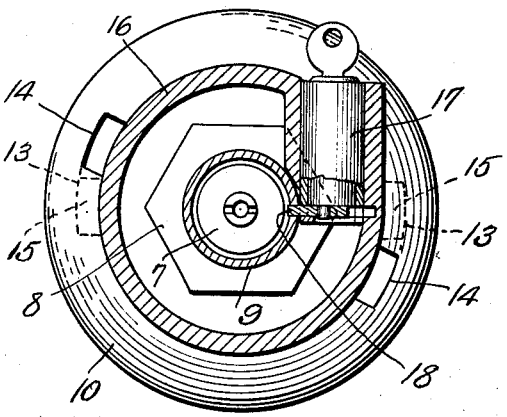
Figure 2 is a sectional view taken on line 2—2 of Figure 1.
Figure 3:
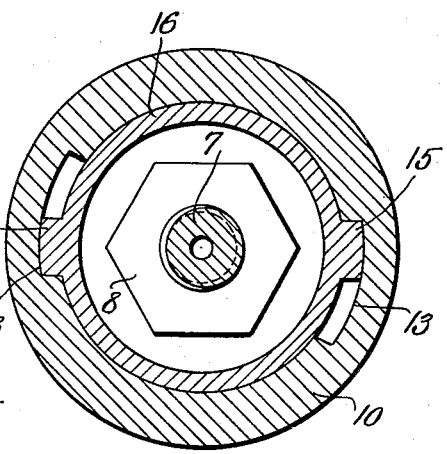
Figure 3 is a sectional view taken on line 3—3 of Figure 1.

Referring to the drawing in detail, the reference character 5 designates a rim which is of the usual and well known construction and on which the tire is positioned, the inner tube 6 forming a part of the tire.

The reference character 7 designates the usual threaded valve stem that passes through the rim, a portion thereof extending beyond the rim as clearly shown by Figure 1.

The usual guarding nut 8 is supported on the valve stem in the usual and well known manner and against which the dust cap 9 moves to insure an extremely tight connection between the dust cap and valve stem to insure against foreign matter entering between the valve stem and rim.

This nut 8 also provides means for securing the lock collar 10 in position, the lock collar being shown as having a removable bottom 11 held in position by means of the screws 12, the bottom 11 being also provided with an opening to permit the valve stem 7 to pass therethrough. This nut 8 as shown, is screwed into position to closely engage the bottom 11 and secure the lock collar 10 on the rim.

A circular groove is formed within the lock collar and defines a circular shoulder 13, portions of the collar being cut away as at 14 providing openings for the reception of the lateral lugs 15 formed at the base of the guard or lock cap 16. Carried by the cap 16 is a lock 17 including a sliding bolt 18 designed to move into an opening formed adjacent to the upper end of the dust cap 9 and in connection with the lock, it might be stated that when the lock cap 16 is positioned, it is necessary to turn the lock cap in an anti-clockwise direction to bring the bolt 18 opposite the opening designed to receive the bolt and formed in the dust cap 9, with the result that in order to remove the lock cap 16, it is necessary to move the lock cap 16 in a clockwise direction to bring the lugs 15 opposite the cut out portions 14, and it will be readily seen that when the lock cap is locked to the dust cap, such movement of the lock cap 16 in a clockwise direction will result in the tightening of the dust cap 9 on the valve stem, and the only way that the guard cap may be removed, to permit the removal of the dust cap, is to operate the lock 17.

I claim:—

1. In combination with a rim and tire valve stem extended through the rim, a lock including a dust cap having an opening adjacent to one end thereof, a lock collar positioned on the valve stem, means for securing the lock collar to the valve stem, a lock cap having lugs and adapted to be positioned over the dust cap, said lugs adapted to cooperate with the collar to secure the lock cap to the collar, and a lock embodying a sliding bolt, carried by the lock collar and adapted to engage within the opening of the dust cap to lock the lock cap and dust cap together.

2. In combination with a valve stem and rim through which the valve stem extends, a locking device including a lock collar, means for securing the lock collar to the rim, a dust cap on the valve stem, a lock cap positioned over the dust cap, means for securing the lock cap to the collar, and means for locking the lock cap to the dust cap.

3. In combination with a valve stem and rim through which the valve stem moves, a dust cap positioned on the valve stem, a locking cap positioned over the dust cap, means for preventing rotary movement of the dust cap and lock cap in an anti-clockwise direction, and means for locking the dust cap and lock cap together to prevent rotary movement of the lock cap and dust cap in a clockwise direction.

4. In combination with a valve stem and rim through which the valve stem passes, a nut on the valve stem for securing the valve stem to the rim, a dust cap on the valve stem and adapted to engage the nut, a lock cap positioned over the dust cap, and adapted to guard the nut, means for preventing movement of the lock cap in an anti-clockwise direction, and means for preventing movement of the lock cap in a clockwise direction.

5. In combination with a valve stem and rim through which the valve stem passes, said stem being threaded, a nut on the valve stem and adapted to lock the valve stem to the rim, a dust cap on the stem and contacting with the nut, a lock cap adapted to house the dust cap, means at the base of the lock cap and cooperating with the lock cap for restricting movement of the lock cap when the lock cap is moved in an anti-clockwise direction, and means for locking the lock cap and dust cap together to prevent rotary movement of the lock cap in a clockwise direction.

6. In combination with the valve stem and rim through which the valve stem passes, said valve stem being threaded, a dust cap threaded on the valve stem, a lock cap positioned over the dust cap, a lock for locking the dust cap and lock cap together, to cause the dust cap to bind on the threads of the valve stem when the lock cap is moved in a clockwise direction, and means for preventing movement of the dust cap and lock cap longitudinally of the valve stem when the lock cap is moved in an anti-clockwise direction.

In testimony that I claim the foregoing as my own, I have hereto affixed my signature.

FRANK R. LOOMIS.